(12) United States Patent
Chandrashekharachar Suvarneshwar

(10) Patent No.: US 9,077,551 B2
(45) Date of Patent: *Jul. 7, 2015

(54) SELECTION OF MULTICAST ROUTER INTERFACES IN AN L2 SWITCH CONNECTING END HOSTS AND ROUTERS, WHICH IS RUNNING IGMP AND PIM SNOOPING

(71) Applicant: JUNIPER NETWORKS, INC., Sunnyvale, CA (US)

(72) Inventor: Sunil Kumar Chandrashekharachar Suvarneshwar, Bangalore (IN)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/288,738

(22) Filed: May 28, 2014

(65) Prior Publication Data

US 2014/0269707 A1 Sep. 18, 2014

Related U.S. Application Data

(63) Continuation of application No. 12/813,931, filed on Jun. 11, 2010, now Pat. No. 8,761,044.

(51) Int. Cl.
*H04L 12/28* (2006.01)
*H04L 12/18* (2006.01)
*H04L 12/761* (2013.01)
*H04L 12/753* (2013.01)

(52) U.S. Cl.
CPC .............. *H04L 12/185* (2013.01); *H04L 45/16* (2013.01); *H04L 45/48* (2013.01)

(58) Field of Classification Search
CPC ........ H04L 12/185; H04L 45/16; H04L 45/48
See application file for complete search history.

(56) References Cited

U.S. PATENT DOCUMENTS

| | | | |
|---|---|---|---|
| 8,099,483 B2 | 1/2012 | Smith et al. | |
| 8,761,044 B2 * | 6/2014 | Chandrashekharachar Suvarneshwar | 370/254 |
| 2005/0114656 A1 * | 5/2005 | Liu et al. | 713/163 |
| 2009/0245248 A1 * | 10/2009 | Arberg et al. | 370/390 |
| 2011/0305239 A1 | 12/2011 | Chandrashekharachar Suvarneshwar | |
| 2014/0269707 A1 * | 9/2014 | Chandrashekharachar Suvarneshwar | 370/390 |

OTHER PUBLICATIONS

D. Estrin et al., "RFC 2362—Protocol Independent Multicast-Sparse Mode (PIM-SM): Protocol Specification," Network Working Group, http://www.faqs.org/rfcs/rfc2362.html, Jun. 1998, pp. 1-51.

(Continued)

*Primary Examiner* — Robert Wilson
(74) *Attorney, Agent, or Firm* — Harrity & Harrity, LLP

(57) ABSTRACT

Multicast traffic received by a subnet that uses IGMP/PIM snooping may be efficiently processed so that only required multicast router interfaces are used. A router may, for example, receive a source-specific PIM join/prune message indicating that a multicast receiver of the multicast traffic is to join/leave a multicast group to receive/stop traffic from a multicast source; determine whether the router is a first hop router relative to a subnet of the multicast source; and forward, when the router is a first hop router relative to the subnet of the multicast source and is a non-designated router, the source-specific PIM join/prune message towards the subnet.

20 Claims, 7 Drawing Sheets

(56) References Cited

OTHER PUBLICATIONS

B. Fenner et al., "RFC 4601—Protocol Independent Multicast—Sparse Mode (PIM-SM): Protocol Specification (Revised)," Network Working Group, http://www.faqs.org/rfcs/rfc4601.html, Aug. 2006, pp. 1-111.

"Configuring PIM Snooping," Chapter 31, Cisco 7600 Series Router Cisco IDS Software Configuration Guide, Release 12.2SX, printed on Jun. 16, 2010, 8 pages.

* cited by examiner

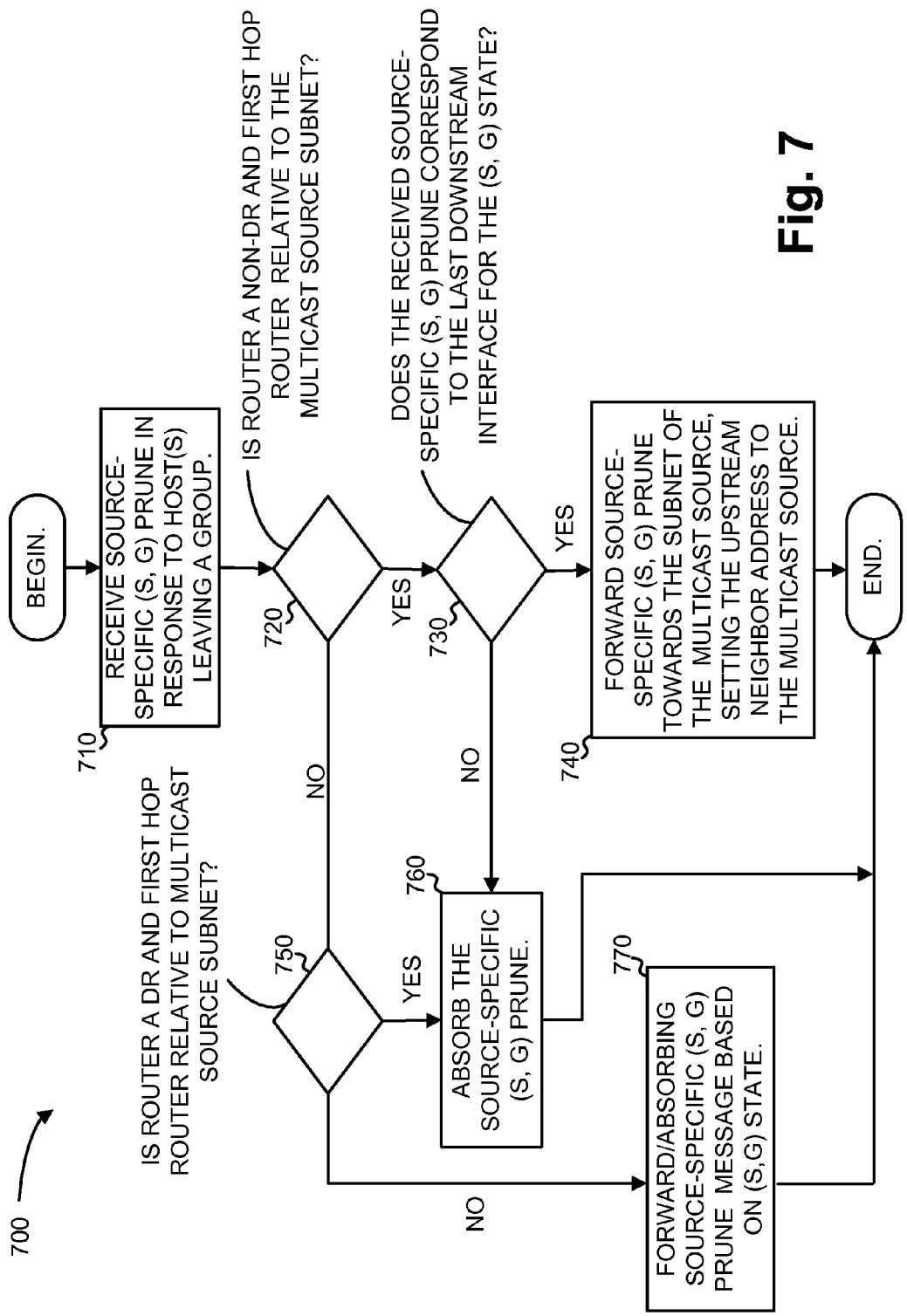

SELECTION OF MULTICAST ROUTER INTERFACES IN AN L2 SWITCH CONNECTING END HOSTS AND ROUTERS, WHICH IS RUNNING IGMP AND PIM SNOOPING

RELATED APPLICATION

This application is a continuation of U.S. patent application Ser. No. 12/813,931, filed Jun. 11, 2010, now U.S. Pat. No. 8,761,044, which is incorporated herein by reference.

BACKGROUND

Computing and communication networks typically include devices, such as routers, switches or gateways, which transfer or switch data, such as packets, from one or more sources to one or more destinations. A network switch or router, in particular, may include a networking device that connects network segments and computing devices.

Traffic through a network, such as an Internet Protocol (IP) based packet switching network, may be transmitted as unicast traffic, where a unicast transmission refers to the sending of messages to a single network destination. Another type of transmission, a multicast transmission, refers to simultaneously sending messages to a group of destinations. In multicast transmissions, it is desirable to send the multicast messages using an efficient delivery strategy that creates copies of the multicast messages only when the links to the multiple destinations split. IP multicast technologies are frequently used to stream multimedia to a number of clients.

A number of different protocols may be used to implement IP multicast. For example, the Internet Group Management Protocol (IGMP) is a communication protocol used to manage the membership of IP multicast groups. IGMP may be used by IP hosts and adjacent multicast routers to establish multicast group memberships. Another protocol, Protocol-Independent Multicast (PIM) includes a family of multicast routing protocols that may be used to efficiently route traffic in multicast groups that may span wide-area (and inter-domain) internets. PIM is termed protocol-independent because PIM does not include its own topology discovery mechanism, but instead uses routing information supplied by other traditional routing protocols, such as the Border Gateway Protocol (BGP).

In multicast networks, VLAN aware Layer 2 switches, referred to as Layer 2 switches herein, are frequently used to implement VLAN-domain/subnets, referred to as a subnet herein, in a larger network. A Layer 2 switch may connect to one or more upstream routers to implement an interface between Layer 2 host devices connected to the switch and a Layer 3 packet network formed by the routers. IGMP snooping is the process of listening to IGMP network traffic at the switch. When IGMP snooping is enabled, the switch may analyze the IGMP packets between hosts connected to the switch and multicast routers in the network and, based on the analysis, filter the multicast packets received from the multicast routers or hosts.

IGMP snooping is designed to prevent hosts on the subnet connected to the switch from receiving traffic for a multicast group that the hosts have not explicitly joined. IGMP snooping provides switches with a mechanism to prune multicast traffic from links that do not contain a multicast listener. A switch that does not IGMP snoop will, by default, 'flood' multicast traffic to all the ports in the subnet. Essentially, IGMP snooping is a Layer 2 optimization in forwarding multicast data towards hosts achieved through snooping of Layer 3 IGMP messages that takes place internally on the switches.

PIM snooping is another form of "snooping". Under IGMP, and even with IGMP snooping, the Layer 2 switch may flood multicast traffic to all its connected multicast router interfaces. With PIM snooping enabled at the Layer 2 switch, however, the Layer 2 switch may listen to PIM protocol messages and restrict multicast traffic to its connected multicast router interfaces through which downstream receivers have joined the multicast group, which otherwise, by default, forwards multicast data only to the designated router (DR) of the subnet.

Optimizations such as PIM snooping and IGMP snooping can collectively operate to forward multicast data only to the intended or needed multicast hosts and routers, leading to optimization of multicast traffic.

SUMMARY

In one implementation, a method may include routing network traffic, by a router, the network traffic including multicast traffic that uses protocol independent multicast to route traffic for multicast groups to which the multicast traffic is to be delivered. The method may further include receiving a source-specific PIM join message indicating that a multicast receiver of the multicast traffic is to join one of the multicast groups to receive traffic from a multicast source and determining whether the router is a first hop router relative to a subnet of the multicast source. The method may further include forwarding, when the router determines that the router is a first hop router relative to the subnet of the multicast source, the source-specific PIM join message towards the subnet of the multicast source.

In another implementation, a router may include a plurality of interfaces associated with communication links through which the router communicates. The router may route multicast traffic using protocol independent multicast to determine traffic routes for the multicast traffic. The router may further include logic to receive a source-specific PIM join message, from another network device, indicating that a multicast receiver of the multicast traffic is to join a multicast traffic group to receive multicast traffic from a multicast source; logic to determine whether the network device is a first hop router relative to a subnet corresponding to the multicast source and whether the router is a non-designated router of the subnet corresponding to the multicast source; and logic to forward, when the router is a first hop router relative to the subnet, is a non-designated router of the subnet corresponding to the multicast source, and when the source-specific PIM join message corresponds to the first downstream interface for a multicast state of the multicast source, the source-specific PIM join message towards the subnet of the multicast source

BRIEF DESCRIPTION OF THE DRAWINGS

The accompanying drawings, which are incorporated in and constitute a part of this specification, illustrate one or more implementations described here and, together with the description, explain these implementations. In the drawings:

FIG. 7 is a flow chart illustrating an example of a process through which a router processes PIM source-specific prune messages.

DETAILED DESCRIPTION

The following detailed description refers to the accompanying drawings. The same reference numbers in different drawings may identify the same or similar elements. Also, the following detailed description does not limit the invention.

A technique for handling protocol messages for multicast traffic is described herein. In particular, PIM source-specific join and prune messages that are received by a first hop router, relative to a multicast source, may be forwarded towards the multicast source. When the multicast source is in a subnet that uses IGMP/PIM snooping, the forwarded PIM source-specific join/prune messages may cause the subnet to more efficiently process the multicast traffic.

System Overview

Figure 1:
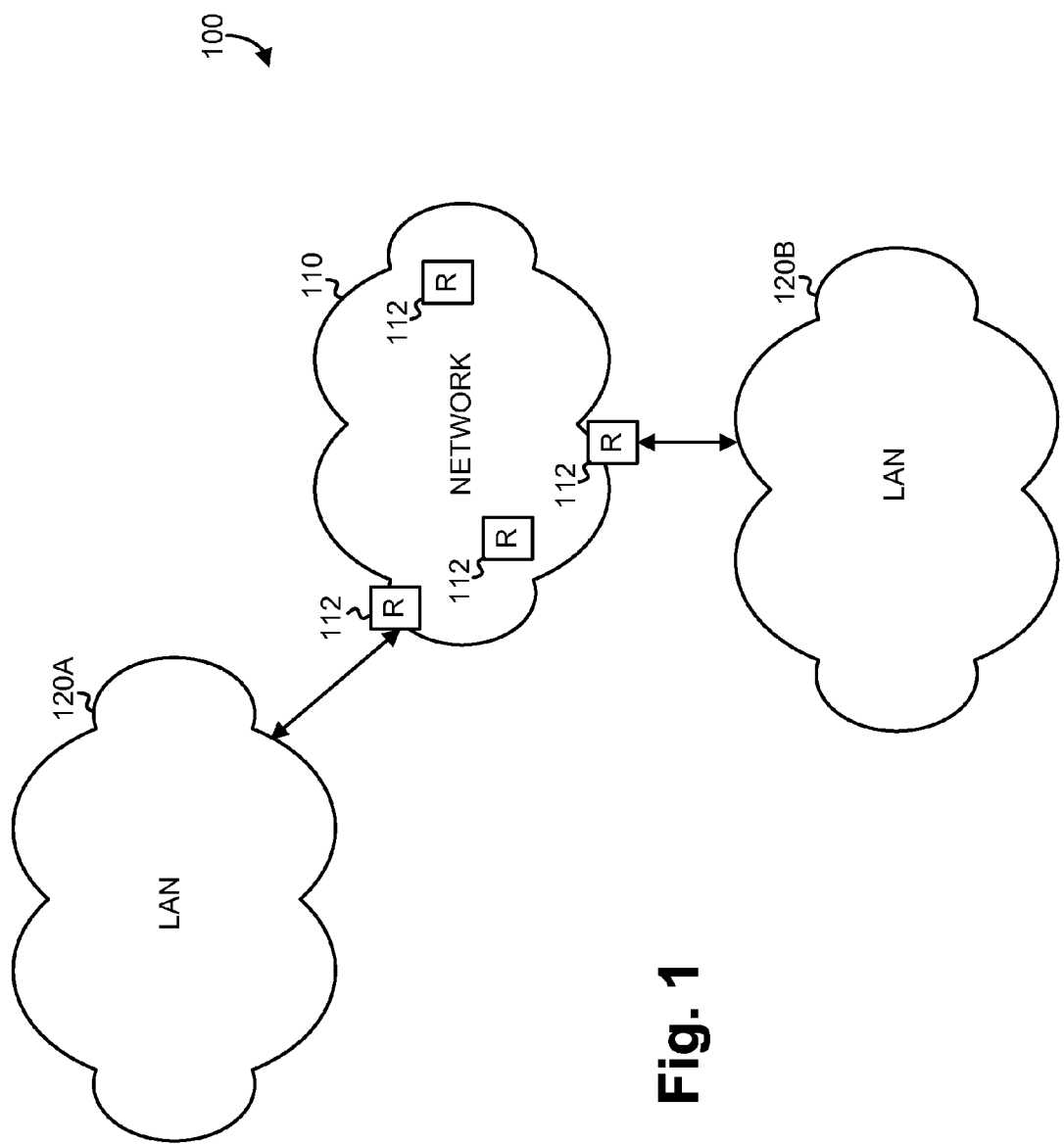
FIG. 1 is a diagram of an example of a system in which concepts described herein may be implemented.

FIG. 1 is a diagram of an example of a system 100 in which concepts described herein may be implemented. System 100 may include a number of physical or logical networks. As particularly shown, system 100 may include a network 110 connected to one or more additional networks, such as local area networks (LANs) 120A and 120B (collectively referred to as LANs 120). LANs 120 may each, for example, include one or more computing devices that are logically organized into a LAN. In one example implementation, LANs 120 may include network devices, such as switches and routers. LANs 120 may particularly be virtual LANs (VLANs).

Network 110 may generally include one or more types of networks. For instance, network 110 may include a wide area network (WAN), such as a cellular network, a satellite network, the Internet, or a combination of these networks that that are used to transport data. Network 110 may particularly be an IP-based packet network that includes a number of routers (R) 112 that route packets through network 110. Network 110 may include a number of separate networks that function to provide services to LANs 120. Network 110 may be implemented using a number of network devices that may include, for example, routers, switches, gateways, or other devices.

LANs 120 may each include a number of computing devices, such as, for example, client computing stations, network devices, or server computing devices. LANs 120A and 120B may each be particularly implemented as Layer 2 switching networks. One or more routers, such as routers 112 within LANs 120A/120B, or combined routing/switching devices, may act as an interface or gateway between network 110 and LANs 120.

Network 110 and LANs 120 may be particularly implemented to handle multicast traffic, such as multicast IP packet-based traffic. For example, network devices in network 120 and/or LANs 120 may implement IGMP to manage IP multicast groups and PIM to efficiently route traffic in the multicast groups.

In system 100 shown in FIG. 1, three networks 110, 120A, and 120B are shown. In other implementations, system 100 may include additional, fewer, different, or differently arranged networks and/or devices.

Figure 2:
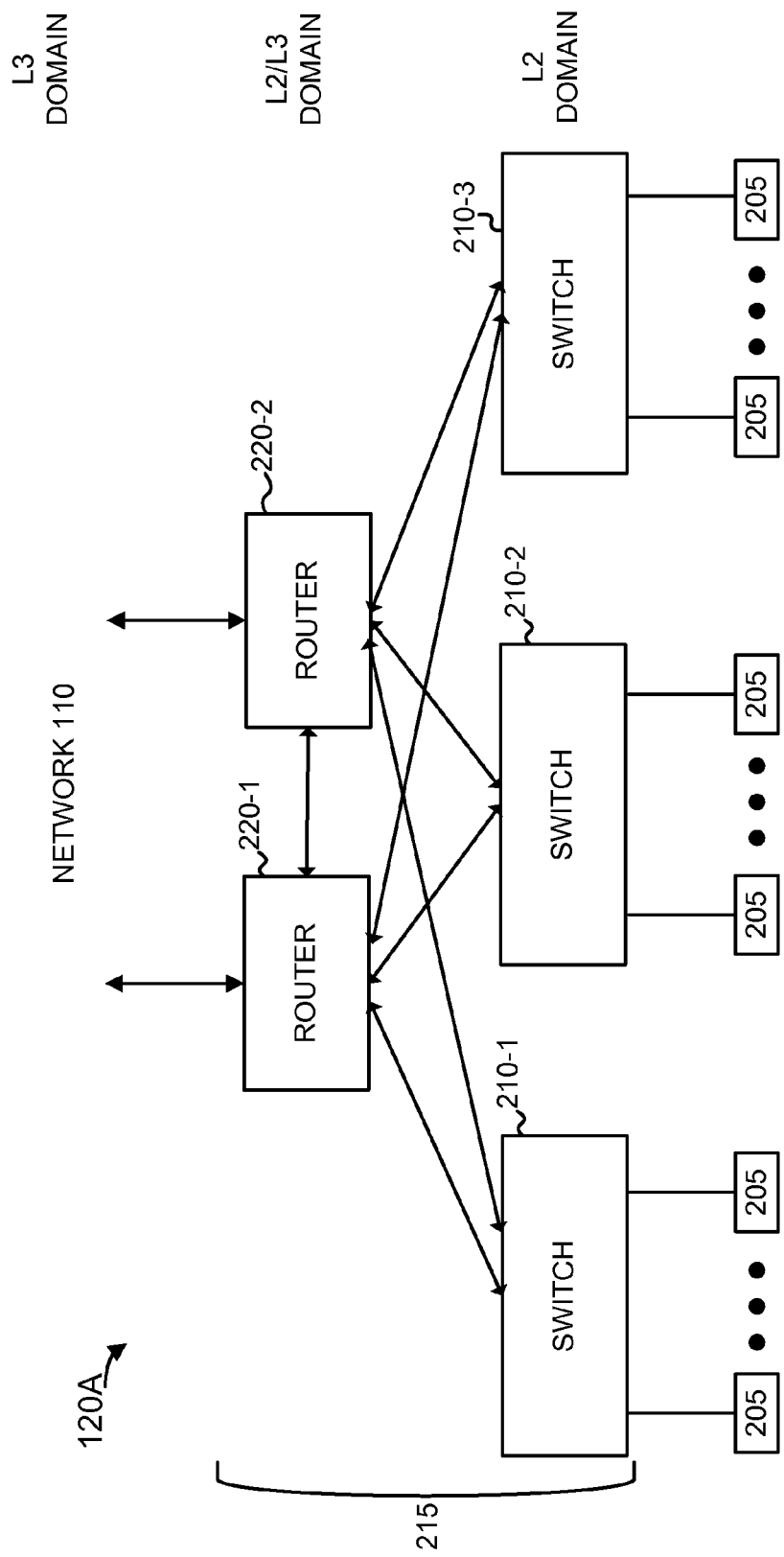
FIG. 2 is a diagram illustrating an example of a local area network shown in FIG. 1.

FIG. 2 is a diagram illustrating an example of an implementation of one of LANs 120, such as LAN 120A. LAN 120B may be similarly arranged. LAN 120A may include a number of client computing or networking devices 205 that are included within a subnet. Each device 205 may be for example, a client or server computing device. In multicast applications, devices 205 may act as multicast sources (i.e., devices that generate multicast streams) or receivers. Devices 205 may be connected to one another and to external LANs or other networks (e.g., network 110) through a switching system 215.

Switching system 215 may include one or more switches 210-1 through 210-3 (collectively, switches 210) and one or more routers 220-1 and 220-2 (collectively, routers 220). Switches 210 and routers 220 may be hierarchically arranged so that each switch 210 is connected to each router 220. Links between switches 210 and routers 220 are illustrated in FIG. 2 as connecting lines. The number of switches 210 and routers 220 shown in FIG. 2 is exemplary. In other implementations, additional or fewer switches 210 or routers 220 may be used.

Each switch 210 may be a VLAN aware Layer 2 switch in the OSI (Open System Interconnect) network model and each router 220 may be a Layer 2/Layer 3 (i.e., each router 220 may perform both Layer 2 and Layer 3 functions) switch or router.

Routers 220 may include devices that can implement both routing and switching functions. One or more of routers 220 may also act as a gateway to external networks or LANs.

In one implementation, multiple routers 220 may be configured redundantly to include a backup router that acts as a gateway for LAN 120A. Further, one router 220 in the redundant router may be designed as the master node, which will act as the actual gateway device, while the other routers 220 may be the backup devices. If the master router fails, a backup router may take over as the new master node.

A redundant router protocol, such as the known Virtual Router Redundancy Protocol (VRRP), may be used to implement the redundant router. VRRP is a protocol designed to increase the availability of the default gateway servicing hosts.

Although routers 220 are illustrated as being part of LAN 120A, in some implementations, routers 220 may be part of network 110. In general, the distinction between whether a network device is included in network 110 or LAN 120 may be an arbitrary one.

Although FIG. 2 illustrates an example of components of a LAN or VLAN (e.g., LAN 120A), in other implementations, LAN 120A may include additional, fewer, different, or differently arranged components than those illustrated in FIG. 2 and described herein. Moreover, one or more components shown in FIG. 2 may perform one or more tasks described herein as being performed by another component.

Device Overview

Figure 3:
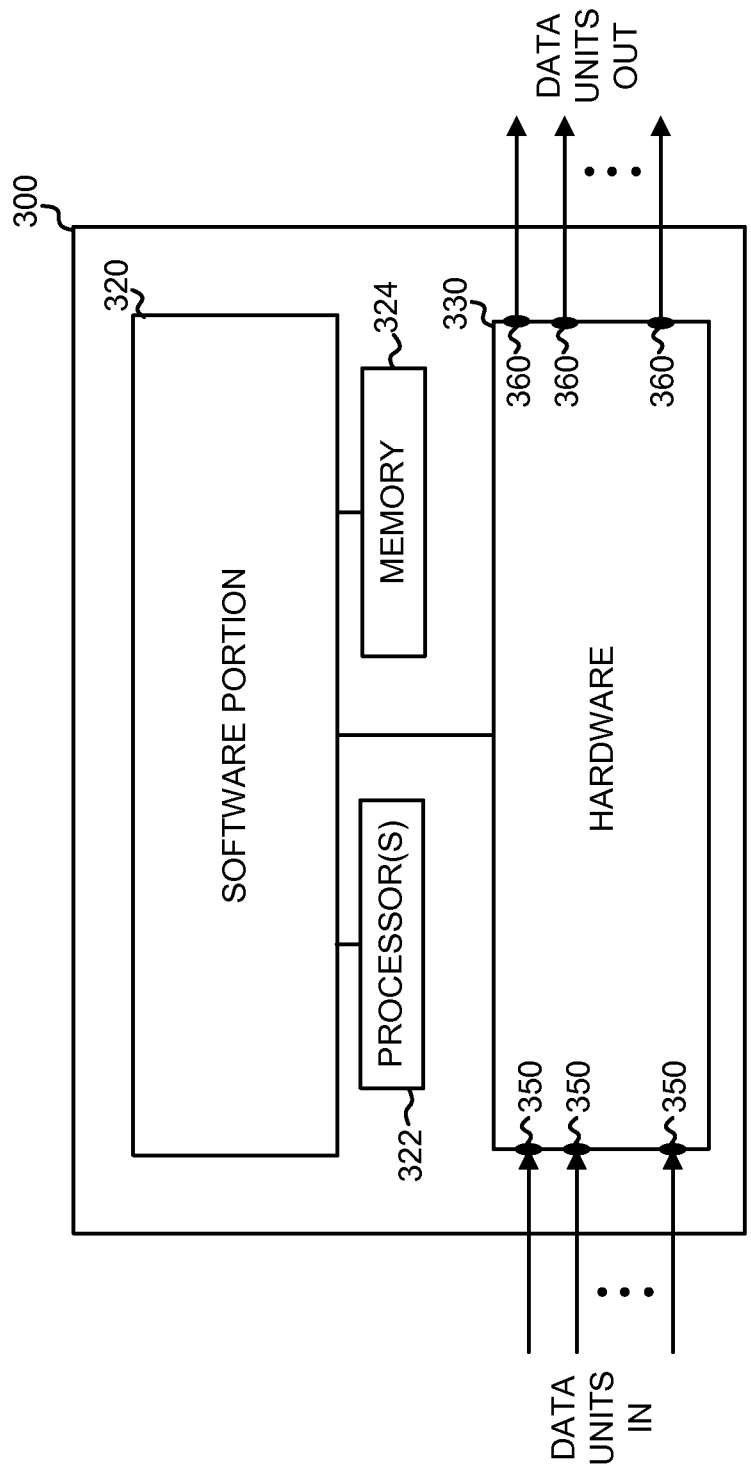
FIG. 3 is a diagram illustrating an example of a network switching/routing device corresponding to a switch or router shown in FIGS. 1 and 2.

FIG. 3 is a diagram illustrating an example of a network switching/routing device 300, which may correspond to one of switches 210 or routers 220.

Switching/routing device 300, when corresponding to switch 210, may perform network switching at the Layer 2 network layer. Switching at the Layer 2 layer may generally include looking up destination addresses, such as addresses specified by a MAC address and/or a VLAN identifier, associated with an incoming data unit (e.g., a packet, frame, etc.).

The lookup may determine the appropriate output interface or link for the data unit. The lookup may be based on a forwarding table that is updated based on one or more protocols executed by switching/routing device 300.

Switching/routing device 300, when corresponding to router 220, may perform network switching at the Layer 2 and/or Layer 3 network layer. When performing network switching at the Layer 3 network layer, switching/routing device 300 may perform functions of a router. The router may, for example, execute routing protocols to select paths over which data units will travel.

As shown in FIG. 3, switching/routing device 300 may include a software portion 320 and a hardware portion 330. Software portion 320 may include software designed to control switching/routing device 300. Software portion 320 may, for example, implement an operating system for switching/routing device 300 and may execute processes designed to implement network protocols used by switching/routing device 300. Software portion 320 may control hardware portion 330 and provide an interface for user configuration of switching/routing device 300. In general, software portion 320 may implement the functions of switching/routing device 300 that are either related to control or that can be implemented in the "slow path" through switching/routing device 300. Software portion 320, although shown as a single abstract block 320 in FIG. 3, may be implemented through, for example, one or more general purpose processors 322 and one or more computer memories 324. Processors 322 may include processors, microprocessors, or other types of processing logic that may interpret and execute instructions. Computer memories 324 (also referred to as computer-readable media herein) may include random access memory (RAM), read-only memory (ROM), or another type of dynamic or static storage device that may store information and instructions for execution by processors 322. In general, general purpose processors 322 may perform certain operations in response to executing software instructions of an application contained in a computer-readable medium, such as computer memories 324.

Hardware portion 330 may include circuitry for efficiently processing data units received by switching/routing device 300. Hardware portion 330 may include, for example, logic, such as an application specific integrated circuit (ASIC), a field programmable gate array (FPGA), a content-addressable memory (CAM) and/or a ternary content-addressable memory (TCAM). Hardware portion 330 may, for example, receive incoming data units, extract header information from the data units, and process the data units based on the extracted header information.

Switching/routing device 300 may also include ports for receiving and transmitting data units. Input ports 350 and output ports 360 are particularly shown for switching/routing device 300.

Although switching/routing device 300 is shown as including a software portion 320 and a hardware portion 330, switching/routing device 300 may, in some implementations, be implemented entirely through hardware.

Although FIG. 3 illustrates an example of components of a switching/routing device 300, in other implementations, switching/routing device 300 may include additional, fewer, different, or differently arranged components than those illustrated in FIG. 3 and described herein. Moreover, one or more components shown in FIG. 3 may perform one or more tasks described herein as being performed by another component.

PIM-SM Overview

In order to assist in the understanding of the concepts described below, a brief overview of the PIM protocol will next be described. Protocol independent multicast-sparse mode (PIM-SM) will particularly be described, and will be referred to as PIM herein.

PIM relies on an underlying topology-gathering protocol to populate a routing table, called the Multicast Routing Information Base (MRIB), with routes. The MRIB may provide the next-hop router along a multicast-capable path to each destination subnet (e.g., LAN or VLAN) and may be used to determine the next-hop neighbor to which a PIM join/prune message is sent/received. PIM "join" and "prune" messages are PIM protocol messages that control the joining and leaving of multicast groups. Multicast data may flow along the reverse path of the join messages. Thus, in contrast to a unicast routing information base, which specifies the next hop that a packet would take to get to some subnet, the MRIB may give reverse-path information and indicate the path that a multicast data packet would take from its origin subnet to a router that stores the MRIB.

Operations under PIM may include joining multicast sources and receivers. A multicast receiver may express an interest in receiving traffic destined for a multicast group. One of the receiver's local routers may be elected as the Designated Router (DR) for that subnet. On receiving the receiver's expression of interest, the DR may send a PIM join message, referred to as a "(*, G) join," towards a "rendezvous point" (RP) for that multicast group. Eventually, the (*, G) join reaches the RP. When many receivers join the group, their join messages converge on the RP and form a distribution tree, called the RP Tree (RPT), for group G that is rooted at the RP.

A RP may be a router that has been configured to be used as the root of the non-source-specific distribution tree for a multicast group. Join messages from receivers for the group may be sent towards the RP, and data from multicast sources may be sent to the RP so that the receivers can discover who the senders are and start to receive traffic destined for the group.

At some point, a multicast source may begin sending data destined for a multicast group. The DR for the multicast source may receive the multicast packets and send them to the RP. The RP may receive the packets and forward them onto the RPT and eventually to the multicast receivers. The packets may then follow the (*, G) multicast tree state in the routers on the RPT, being replicated wherever the RPT branches, and eventually reaching all the receivers for that multicast group.

For increased traffic transmission efficiency, PIM includes a Shortest-Path Tree (SPT) delivery mode. For SPT, a router on a multicast receiver's subnet, such as a DR, may initiate a transfer from the shared tree (i.e., the RPT) to a source-specific shortest-path tree. The DR may issue a "(S, G) join" (i.e., a source-specific join message) towards the specific multicast source, S. The source-specific join message indicates that the multicast receiver is to join the multicast group G to receive traffic over the SPT from multicast source S. Eventually, the (S, G) join reaches one of the first hop routers of the source. When this happens, packets may begin to flow from the multicast source to the multicast receiver following the (S, G) state. At this point, the multicast receiver (or a router upstream of the receiver) will be receiving two copies of the data: one from the SPT and one from the RPT if the SPT and RPT are different paths. If the SPT and RPT paths are different, an "(S, G) prune" message may be forwarded towards the RP. The (S, G) prune message may travel hop-by-hop, instantiating state along the path towards the RP indicating that traffic from the source, S, for group G should not be forwarded in that direction. The (S, G) prune message may be propagated until it reaches the RP or a router that still needs the traffic from S for other receivers.

When all receivers on a leaf-network leave a group, the DR may send a PIM (*, G) prune message towards the RP for that multicast group and a source-specific (S, G) prune message to every source corresponding to the (S, G) join messages that the DR has previously sent. The (*, G) prune message may cause the upstream routers in the RPT to trim the downstream interface through which the receiver DR is reachable from the (*, G) multicast state, and the source-specific (S, G) prune will cause the upstream routers in the shortest-path-tree (SPT) to trim the downstream interface through which the receiver DR is reachable from the (S, G) multicast state.

Selection of Required Multicast Router Interfaces

In multicast, it is desirable that multicast traffic is only forwarded through interfaces, such as multicast router interfaces, that need the multicast traffic. IGMP snooping and PIM snooping may be implemented to increase multicast efficiency. Consistent with aspects described herein, routers/switches in a multicast system may handle multicast protocol messages in a way in which only needed multicast router interfaces are selected for a multicast subnet.

Figure 4:
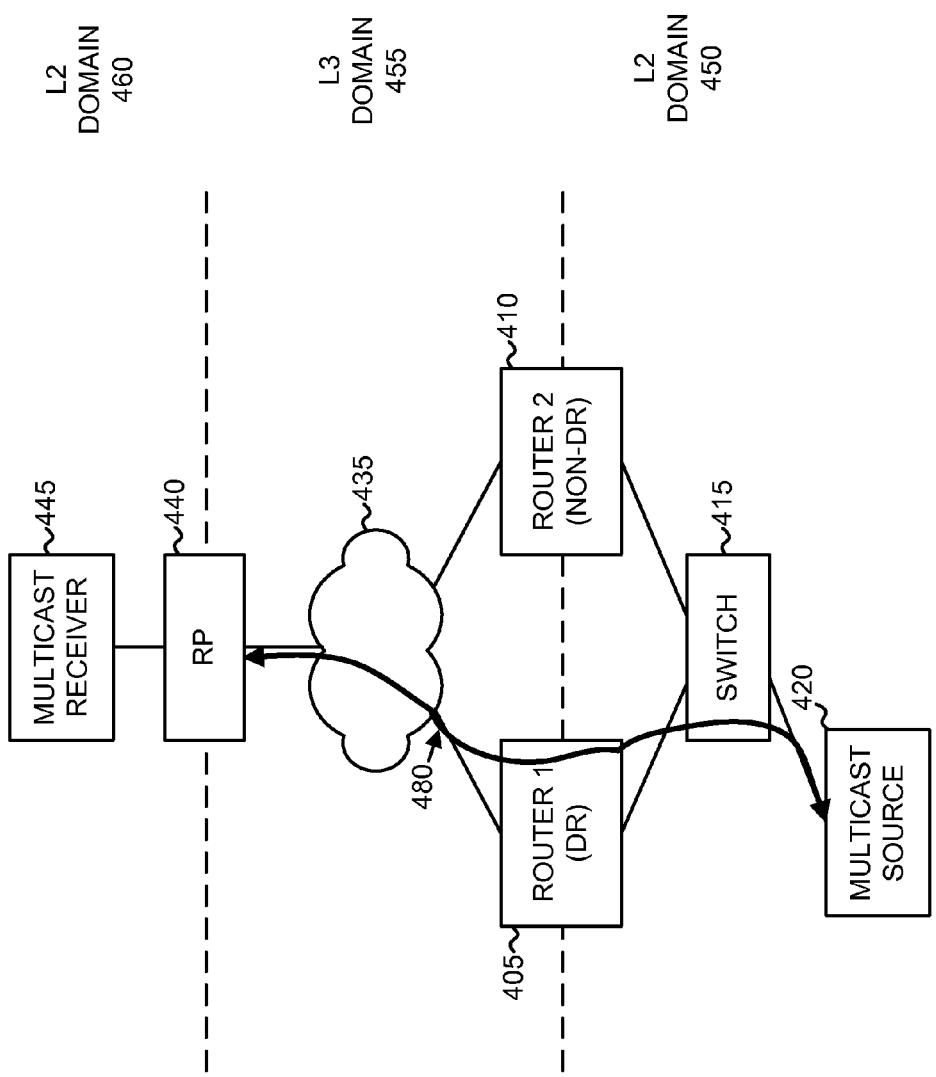
FIG. 4 is a diagram illustrating an example of network elements, including switches and routers, in an exemplary network topology.

FIG. 4 is a diagram illustrating an example of network elements, including switches and routers, in an example network topology. As shown in FIG. 4, assume that two routers, router 405 (ROUTER 1) and router 410 (ROUTER 2) are connected to form an interface between an L2 domain 450 and L3 domain 455. Routers 405 and 410 may be connected as a router in which routers 405 and 410 provide redundant connectivity, using VRRP, to L2 domain 450. L2 domain 450 may define a subnet that includes switch 415 and one or more multicast sources 420. L3 domain 455 may include an L3 network 435 (e.g., an IP packet-based network) that connects to a PIM rendezvous point (RP) 440. RP 440 may provide an interface between L3 domain 455 and/or L2 domain 460. Multicast receiver 445, in L2 domain 460, may connect to RP 440.

In multicast operation, a multicast source 420 may transmit multicast traffic to multicast receiver 445, which has registered to receive the multicast traffic. Multicast receiver 445 may request to receive multicast traffic by joining a multicast group. Subsequent traffic to that group may be distributed to all members of the group. PIM may be used to perform routing services for the multicast groups and IGMP may be used to manage the membership of the multicast groups.

Multicast source 420 and multicast receiver 445 may include, for example, computing devices that act as a source and destination, respectively, for multicast traffic.

Switch 415 may include an L2 switching device, such as one of switches 210. Switch 415 may be configured to provide IGMP snooping and PIM snooping in which switch 415 may passively monitor IGMP and PIM messages received by switch 415. Based on the IGMP and PIM messages, switch 415 may filter multicast traffic on its way to routers 405/410 or multicast source 420. In particular, IGMP snooping may be used to filter multicast traffic received at switch 415 and destined for L2 domain 450, such as multicast source 420. With IGMP snooping enabled, multicast traffic that may otherwise be transmitted to multicast source 420 attached to switch 415 may be restricted from transmission to multicast source 420 when the multicast traffic is not relevant to the multicast source. PIM snooping may be used to filter multicast traffic received at switch 415 and destined for a multicast router interface, such as an interface of routers 405 and 410. With PIM snooping enabled, multicast traffic that may otherwise be flooded to all multicast routers may be restricted from transmission to router 405 or router 410 when the multicast traffic is not relevant to the router. Both PIM snooping and IGMP snooping may be used to reduce unnecessary multicast traffic.

As mentioned, routers 405 and 410 may be connected as a router in which routers 405 and 410 may provide redundant connectivity to L2 domain 450. For purposes of PIM, one of routers 405 and 410 may be the DR. As shown in FIG. 4, router 405 is the DR while router 410 is the non-designated (non-DR) router. In general, under PIM, a shared-media LAN like Ethernet (e.g., the interface to switch 415) may have multiple PIM routers connected to it. The DR may act on behalf of directly connected hosts (e.g., multicast source 420) with respect to the PIM protocol. Only the DR may be authorized to originate PIM messages, such as periodic PIM join/prune messages (or other messages, such as PIM register messages), for each group with which the DR has active members, to RP 440. The DR may be determined by the connected routers using a predetermined protocol, such as a protocol in which "hello" messages exchanged between routers 405 and 410 are used to determine which of routers 405 and 410 may become the DR. The predetermined protocol may also be implemented by switch 415, so that switch 415, due to PIM snooping, is also aware of the DR.

RP 440 may include a router configured to be used as the root of the non-source-specific RPT for a multicast group. PIM messages, such as PIM "join" messages, from the DR of multicast receivers for a group may be sent towards RP 440. Multicast traffic from multicast source 420 may be sent to RP 440 so that multicast receiver 445 can discover the multicast source and start to receive traffic destined for the group.

In multicast operation, switch 415 may also store an indication of which of its interfaces correspond to the DR. Multicast data received from multicast source 420 may be forwarded over this interface to the DR router. In situations in which multicast receivers 445 are closer to (or as equally close to) DR router 405 than non-DR router 410, multicast traffic from multicast source 420 may be efficiently transmitted from the source, through the DR router, and to multicast receivers 445. An example of a traffic path is shown as path 480 in FIG. 4. Due to PIM snooping, switch 415 does not forward traffic to non-DR router 410.

In the topology shown in FIG. 4, only DR router 405 is a multicast data forwarder with respect to multicast source 420 and multicast receivers 445 for the L2 domain 450, assuming designated router 405 is closer to the receivers than non-DR 410. Enabling only IGMP snooping in switch 415, without PIM snooping, may cause switch 415 to send the multicast data sent by multicast source 420 to both DR 405 and non-DR 410. As per the topology shown in FIG. 4, sending multicast data to non-DR 410 by switch 415 is not desirable. In some topologies, however, it may be necessary for non-DR router 410 to also act as a multicast data forwarder.

Figure 5:
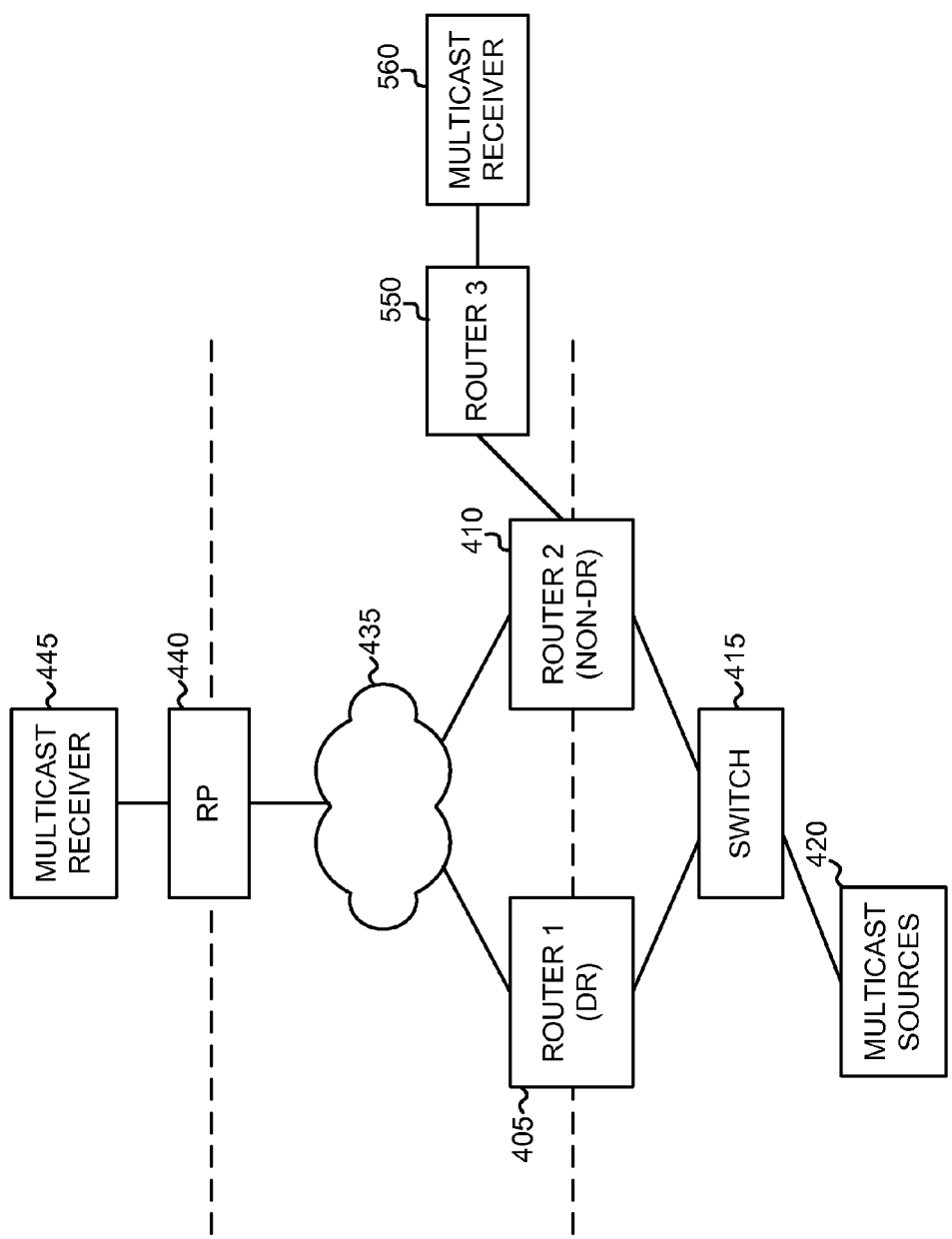
FIG. 5 is a diagram illustrating an example of a network elements arranged in another exemplary network topology.

FIG. 5 is a diagram illustrating an example of network elements, including switches and routers, in a network topology in which a non-DR router is a multicast data forwarder. The network topology shown in FIG. 5 is similar to that shown in FIG. 4. Additionally, however, in FIG. 5, an additional router 550 (ROUTER 3) is coupled to router 410. Router 550 connects, either directly or indirectly, to one or more additional multicast receivers 560.

It can be appreciated that router 410 can similarly connect directly or indirectly to one or more additional multicast receivers similar to router 550. The topology shown in FIG. 5 is an exemplary topology chosen to clearly illustrate concepts described herein. In a situation in which router 410 is directly connected to receivers through a different ("second") LAN and router 410 is the DR for that LAN, all the PIM related process done by router 550, as described herein, may be performed by router 410 with respect to the second LAN. In such a case router 410 may act as both a DR and a non-DR as it would be a non-DR for the LAN connecting to router 405 and DR for the second LAN.

In FIG. 5, non-DR router 410 is closer to multicast receiver 560 than DR router 405 and is the multicast data forwarder with respect to multicast source 420 and multicast receivers 560 for the L2 domain 450 after the SPT.

Under current standards, when multicast receiver 560 joins a multicast group G, a (*, G) join message may propagate through router 550 and router 410 on its way to RP 440. When the multicast source, multicast source 420, starts to send multicast data to group G, the multicast data may travel upstream (i.e., up through the RPT) switch 415, DR router 405, to RP 440. RP 440 may then forward the multicast data downstream to the multicast receiver, including multicast receiver 560. At this point, the L3 multicast data path may be: MULTICAST SOURCE→DR→RP→ROUTER 2→ROUTER 3→MULTICAST RECEIVER.

At some point, router 550 may initiate multicast SPT deliver mode in which multicast data from a multicast source 420 should be delivered to multicast receiver 560 by the shortest available path. In the network topology of FIG. 5, the shortest L3 multicast path may be: MULTICAST SOURCE→ROUTER 2→ROUTER 3→MULTICAST RECEIVER. To initiate the SPT switchover, router 550 may send a source-specific PIM join message, (S, G) join (where S represents the multicast source and G the multicast group), to router 410. In router 550, the reverse path forwarding (RPF) neighbor for multicast source 420 may be router 410. Under the PIM protocol, router 410 will absorb the (S, G) join received from router 550 when the multicast source is directly connected to router 410. As (S, G) join gets absorbed in router 410, switch 415, with PIM snooping enabled, will continue to forward multicast traffic to only DR router 405, as PIM snooping is based on snooping PIM join/prune messages. Thus, the shortest L3 multicast path will not be realized.

Figure 6:
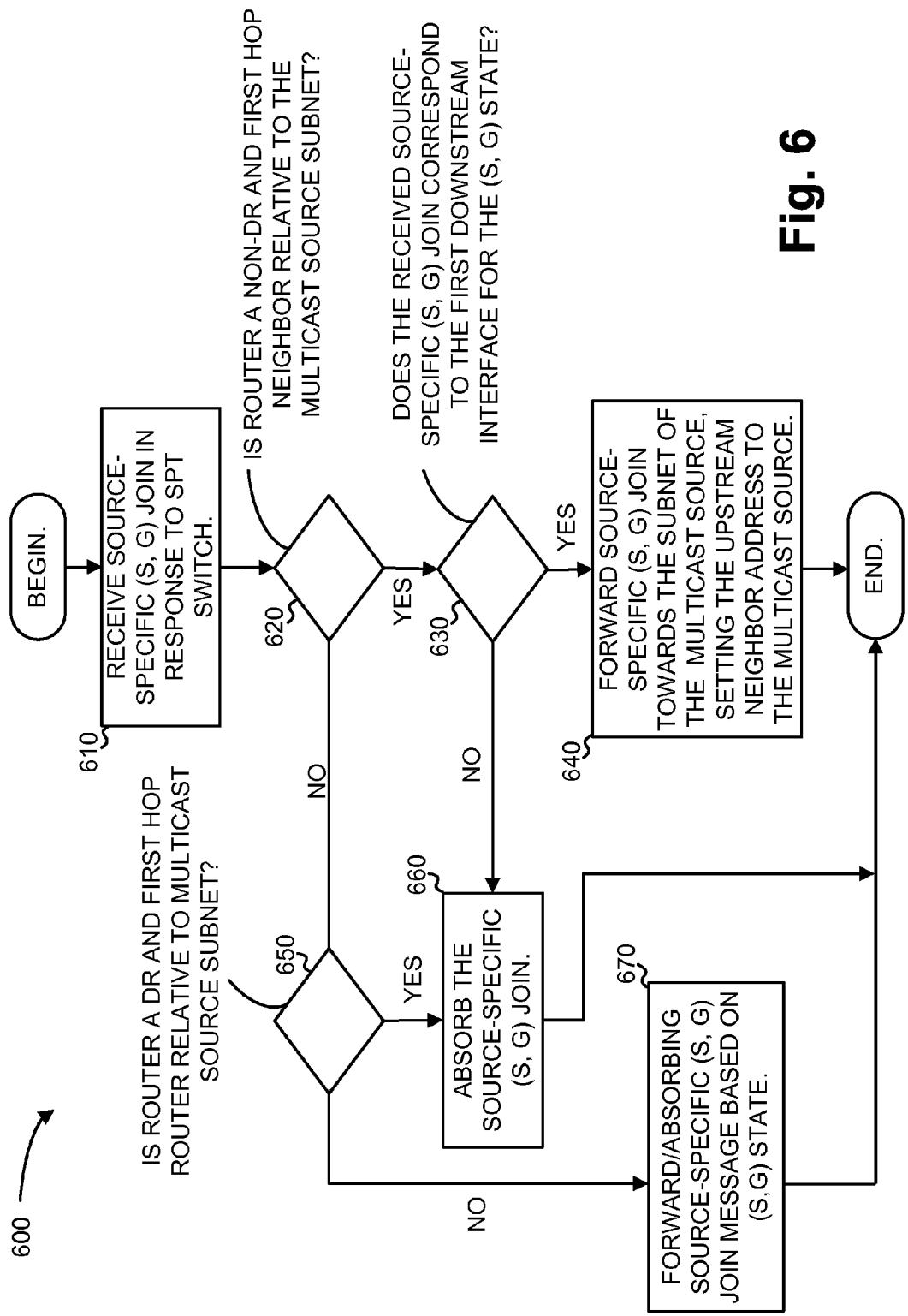
FIG. 6 is a flow chart illustrating an example of a process through which a router processes source-specific PIM join messages.

FIG. 6 is a flow chart illustrating an example of a process 600 through which a router processes source-specific PIM join messages.

After initially joining a group, a multicast receiver, such as multicast receiver 560, may receive multicast data over a path from the RPT. At some point, to obtain more efficient bandwidth usage, an SPT switchover may be performed so that the multicast receiver may receive multicast data through a shortest-path tree. In FIG. 5, for example, the DR for a multicast receiver, such as router 550 for multicast receiver 560, may initiate the SPT switchover by issuing a source-specific join message (an "(S, G) join") upstream towards the RPF neighbor of the source. This instantiates state in the routers along the path to S (i.e., multicast source 420).

As shown in FIG. 6, process 600 may include receiving a source-specific (S, G) join message (block 610). The source-specific join message may be received by routers along the path to the source S until the source-specific join message reaches one of the first hop routers of the subnet associated with S (i.e., in FIG. 5, the subnet including switch 415 and multicast source 420). In the example of FIG. 5, assume that router 410, which is the non-DR router for the subnet that includes multicast source 420, receives the source-specific join message.

Process 600 may further include determining if the router is a non-DR router that is also a first hop router for the multicast source (block 620). In the case of router 410, it is a non-DR router for the subnet that includes multicast source 420. It is also a first hop router for the subnet as it is one of the first routers connected to the subnet.

When the condition of block 620 is satisfied, i.e., block 620 is YES, process 600 may further include determining if the received source-specific (S, G) join corresponds to the first downstream interface for the multicast (S, G) state (block 630). If the determination in block 630 is YES, the router may forward the source-specific join message towards the subnet of the multicast source (block 640). When forwarding the source specific join message, an upstream neighbor field in the source specific join message may be set to an address of the multicast source (block 640). In the example of FIG. 5, router 410 will forward the source-specific join message to switch 415. By forwarding the source specific join message into the PIM snooping switch, such as switch 415, switch 415 will "snoop" the join message and begin forwarding multicast data to the router. Accordingly, forwarding the source specific join message to switch 415 may cause switch 415 to begin forwarding multicast data from multicast source 420 to router 410 even through router 410 is a non-DR router and would not normally forward multicast traffic. Advantageously, an optimal SPT path can be realized from the multicast source to the multicast receiver. To wit, in the system of FIG. 5, the optimal SPT path may be: MULTICAST SOURCE→ROUTER 2→ROUTER 3→MULTICAST RECEIVER.

If however, the router is the DR or the first hop neighbor relative to the multicast source subnet (i.e., block 620—NO), the router may determine if the router is the DR and the first hop router relative to the multicast source subnet (block 650). If either the determination in block 650 is YES or the determination in block 630 is NO, the router (i.e., router 405 is the example of FIG. 5), may absorb the source-specific (S, G) join message. In other words, the router may not re-transmit the source-specific (S, G) join message. When the determination in block 650 is NO, the router may forward the source-specific join message upstream towards the RPF neighbor of the source (block 670). More specifically, in this case, the source-specific join message may be handled according to the conventional PIM.

FIG. 7 is a flow chart illustrating an example of a process 700 through which a router processes source-specific PIM prune messages.

At some point, a multicast receiver (host) may chose to leave a group. A PIM (*, G) prune message (and a source-specific (S, G) prune message to every source to which a source-specific (S, G) join message was previously sent) may be issued by the router for the receiver, such as the DR for the receiver, to initiate leaving the group. In the example shown in FIG. 5, assume that multicast receiver 560 leaves a group. Under the PIM protocol, router 410 will absorb the (S, G) prune received from router 550 when the multicast source is directly connected to router 410.

Process 700 may include receiving the source-specific (S, G) PIM prune message (block 710). Process 700 may further include determining if the router that receives the source-specific PIM prune message is a non-DR router and first hop router relative to the multicast source subnet (block 720). In the case of router 410, router 410 is a non-DR router for the subnet that includes multicast source 420. It is also a first hop router for the subnet as it is one of the first routers connected to the subnet.

When the condition of block 720 is satisfied, i.e., block 720 is YES, process 700 may further include determining if the received source-specific (S, G) prune corresponds to the last downstream interface for the multicast (S, G) state (block 730). If the determination in block 730 is YES, the router may forward the source-specific prune message towards the subnet of the multicast source (block 740). When forwarding the source specific prune message, an upstream neighbor field may be set to an address of the multicast source (block 740). In the example of FIG. 5, router 410 will forward the source-specific join message to switch 415. By forwarding the source specific prune message into the PIM snooping switch, such as switch 415, switch 415 will "snoop" the prune message and will respond by removing the multicast router interfaces for that group, effectively stopping the forwarding of multicast data for that group.

If however, the router is the DR or the first hop neighbor relative to the multicast source subnet (i.e., block 720—NO), the router may determine if the router is the DR and the first hop router relative to the multicast source subnet (block 750). If either the determination in block 750 is YES or the determination in block 730 is NO, the router (i.e., router 410 is the example of FIG. 5), may absorb the source-specific (S, G) prune message. In other words, the router may not re-transmit the source-specific (S, G) prune message. When the determination in block 750 is NO, the router may forward the source-specific prune message upstream towards the RPF neighbor of the source (block 770). More specifically, in this case, the source-specific prune message may be handled according to conventional PIM processing.

CONCLUSION

While a series of operations has been described with regard to FIGS. 6 and 7, the order of the operations may be varied in other implementations consistent with the invention.

It will also be apparent that aspects described herein may be implemented in many different forms of software, firmware, and hardware in the implementations illustrated in the figures. The actual software code or specialized control hardware used to implement aspects described herein is not intended to limit the scope of the invention. Thus, the operation and behavior of the aspects were described without reference to the specific software code—it being understood that software and control hardware can be designed to implement the aspects based on the description herein.

Further, certain aspects described herein may be implemented as "logic" or as a "component" that performs one or more functions. This logic or component may include hardware, such as an application specific integrated circuit or a field programmable gate array, or a combination of hardware and software.

No element, act, or instruction used in the description of the invention should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed:

1. A network device comprising:
a memory to store instructions; and
one or more processors to execute the instructions to:
receive a source-specific protocol independent multicast (PIM) message indicating that a device is to join or leave a multicast traffic group that receives multicast traffic from a multicast source;
determine, based on receiving the source-specific PIM message, whether the network device is one hop away from a subnet corresponding to the multicast source;
determine, based on receiving the source-specific PIM message, whether the network device is a non-designated network device for the subnet of the multicast source; and
selectively forward the source-specific PIM message towards the subnet of the multicast source based on whether the network device is one hop away from the subnet and whether the network device is the non-designated network device for the subnet.

2. The network device of claim 1, where the source-specific PIM message comprises a source-specific PIM prune message indicating that the device is to leave the multicast traffic group; and
where, when selectively forwarding the source-specific PIM message towards the subnet of the multicast source, the one or more processors are to:
forward the source-specific PIM prune message towards the subnet of the multicast source when the network device is one hop away from the subnet of the multicast source and the network device is the non-designated network device.

3. The network device of claim 2, where, when forwarding the source-specific PIM prune message towards the subnet, the one or more processors are to:
set a field in the source-specific PIM prune message to an address of the multicast source.

4. The network device of claim 1, where, when selectively forwarding the source-specific PIM message, the one or more processors are to:
forward the source-specific PIM message towards the subnet of the multicast source when the network device is one hop away from the subnet of the multicast source and the network device is the non-designated network device; or
determine not to forward the source-specific PIM message when the network device is one hop away from the subnet of the multicast source and the network device is a designated network device for the subnet of the multicast source.

5. The network device of claim 1, where, when selectively forwarding the source-specific PIM message, the one or more processors are to:
forward, based on routing information associated with the multicast source, the source-specific PIM message towards the subnet of the multicast source when the network device is not one hop away from the subnet of the multicast source.

6. The network device of claim 1, where, when selectively forwarding the source-specific PIM message, the one or more processors are to:
when the network device is one hop away from the subnet of the multicast source and the network device is the non-designated network device:
selectively forward the source-specific PIM message to a Layer 2 Internet Group Management Protocol (IGMP) and PIM snooping switch in the subnet of the multicast source to cause routing information associated with the multicast source to be modified.

7. The network device of claim 1, where, when selectively forwarding the source-specific PIM message, the one or more processors are to:
forward the source-specific PIM message when:
the network device is the non-designated network device,
the network device is not one hop away from the subnet of the multicast source, and the network device is not a first hop relative to the subnet of the multicast source,
the source-specific PIM message being forwarded based on routing information associated with the multicast source.

8. A method comprising:
receiving, by a network device, a source-specific protocol independent multicast (PIM) message indicating that a device is to join or leave a multicast traffic group that receives multicast traffic from a multicast source;
determining, by the network device and based on receiving the source-specific PIM message, whether the network device is one hop away from a subnet corresponding to the multicast source;
determining, by the network device and based on receiving the source-specific PIM message, whether the network device is a non-designated network device for the subnet of the multicast source; and
selectively forwarding, by the network device, the source-specific PIM message towards the subnet of the multicast source based on whether the network device is one hop away from the subnet and whether the network device is the non-designated network device for the subnet.

9. The method of claim 8, where the source-specific PIM message comprises one of:
a source-specific PIM prune message indicating that the device is to leave the multicast traffic group, or
a source-specific PIM join message indicating that the device is to join the multicast traffic group.

10. The method of claim 8, where selectively forwarding the source-specific PIM message includes:
forwarding the source-specific PIM message towards the subnet of the multicast source when:
the network device is one hop away from the subnet of the multicast source, and
the network device is the non-designated network device.

11. The method of claim 10, where forwarding the source-specific PIM message towards the subnet includes:
initiating a switchover to shortest path tree routing for traffic between the device and the multicast source.

12. The method of claim 8, where selectively forwarding the source-specific PIM message further includes:
determining not to forward the source-specific PIM message when:
the network device is one hop away from the subnet of the multicast source, and
the network device is a designated network device for the subnet of the multicast source.

13. The method of claim 8, where selectively forwarding the source-specific PIM message includes:
selectively forwarding the source-specific PIM message to a Layer 2 Internet Group Management Protocol (IGMP) and PIM snooping switch in the subnet of the multicast source to cause routing information, associated with the multicast source, to be modified.

14. The method of claim 8, where the source-specific PIM message is a source-specific PIM join message indicating that the device is to join the multicast traffic group, and
where selectively forwarding the source-specific PIM message includes:
selectively forwarding, when the network device is the non-designated network device and is not one hop away the subnet of the multicast source, the source-specific PIM join message further based on whether the network device is a first hop relative to the subnet of the multicast source,
the source-specific PIM join message being forwarded when the network device is not a first hop relative to the subnet of the multicast source.

15. A non-transitory computer-readable medium storing instructions, the instructions comprising:
one or more instructions that, when executed by one or more processors, cause the one or more processors to:
receive a source-specific protocol independent multicast (PIM) message associated with a multicast traffic group that receives multicast traffic from a multicast source;
determine, based on receiving the source-specific PIM message, whether the network device is one hop away from a subnet corresponding to the multicast source;
determine, based on receiving the source-specific PIM message, whether the network device is a non-designated network device for the subnet of the multicast source; and
selectively forward the source-specific PIM message towards the subnet of the multicast source based on whether the network device is one hop away from the subnet and whether the network device is the non-designated network device for the subnet.

16. The non-transitory computer-readable medium of claim 15, where the source-specific PIM message comprises a source-specific PIM prune message,
where the source-specific PIM prune message indicates that the device is to leave the multicast traffic group; and
where the one or more instructions to selectively forward the source-specific PIM message towards the subnet of the multicast source include:
one or more instructions that, when executed by the one or more processors, cause the one or more processors to:
forward the source-specific PIM prune message towards the subnet of the multicast source when:
the network device is one hop away from the subnet of the multicast source, and
the network device is the non-designated network device.

17. The non-transitory computer-readable medium of claim 15, where the one or more instructions to selectively forward the source-specific PIM prune message towards the subnet include:
one or more instructions that, when executed by the one or more processors, cause the one or more processors to:
forward the source-specific PIM message towards the subnet of the multicast source when the network device is one hop away from the subnet of the multicast source and the network device is the non-designated network device; or
determine not to forward the source-specific PIM message when the network device is one hop away from the subnet of the multicast source and the network device is a designated network device for the subnet of the multicast source.

18. The non-transitory computer-readable medium of claim 15, where the one or more instructions to selectively forward the source-specific PIM message include:
one or more instructions that, when executed by the one or more processors, cause the one or more processors to:
forward the source-specific PIM message towards the subnet of the multicast source when the network device is not one hop away from the subnet of the multicast source.

19. The non-transitory computer-readable medium of claim 15, where, when selectively forwarding the source-specific PIM message, the one or more processors are to:
when:
- the network device is one hop away from the subnet of the multicast source, and
- the network device is the non-designated network device:
    - selectively forward the source-specific PIM message to a Layer 2 Internet Group Management Protocol (IGMP) and PIM snooping switch in the subnet of the multicast source to cause routing information, associated with the multicast source, to be modified.

20. The non-transitory computer-readable media of claim 15, where the one or more instructions to selectively forward the source-specific PIM message include:
forward the source-specific PIM message when:
- the network device is the non-designated network device,
- the network device is not one hop away from the subnet of the multicast source, and
- the network device is not a first hop relative to the subnet of the multicast source,
- the source-specific PIM message being forwarded based on routing information associated with the multicast source.

* * * * *